(12) United States Patent
Harm (10) Patent No.: US 6,801,126 B2
(45) Date of Patent: Oct. 5, 2004

(54) METHOD AND APPARATUS FOR INSTALLING TIRE PRESSURE MONITOR ASSEMBLY ONTO WHEELS

(75) Inventor: Glen Harm, Fraser, MI (US)

(73) Assignee: Dominion Technologies Group, Inc., Roseville, MI (US)

( * ) Notice: Subject to any disclaimer, the term of this patent is extended or adjusted under 35 U.S.C. 154(b) by 85 days.

(21) Appl. No.: 10/200,089

(22) Filed: Jul. 19, 2002

(65) Prior Publication Data

US 2004/0011445 A1 Jan. 22, 2004

(51) Int. Cl.[7] .............................................. B60C 23/02
(52) U.S. Cl. ...................... 340/442; 340/447; 73/146.2; 73/865.8; 157/1.1
(58) Field of Search ................................ 340/442, 447; 73/865.8, 146.2, 146.8; 157/1, 1.1, 1.11, 1.17, 1.24, 1.26

(56) References Cited

U.S. PATENT DOCUMENTS

| | | | | |
|---|---|---|---|---|
| 4,584,873 A | * | 4/1986 | Ongaro | ........................ 73/146 |
| 4,830,079 A | * | 5/1989 | Onuma | ...................... 157/1.24 |
| 5,141,040 A | * | 8/1992 | Curcuri | ..................... 157/1.17 |
| 5,600,301 A | | 2/1997 | Robinson | |
| 5,604,482 A | | 2/1997 | Majeed et al. | |
| 5,928,444 A | | 7/1999 | Loewe et al. | |
| 6,011,462 A | | 1/2000 | Cooper | |
| 6,034,596 A | | 3/2000 | Smith et al. | |
| 6,173,213 B1 | * | 1/2001 | Amiguet et al. | ............ 700/230 |
| 6,259,361 B1 | | 7/2001 | Robillard et al. | |
| 6,362,731 B1 | | 3/2002 | Lill | |
| 6,369,703 B1 | | 4/2002 | Lill | |
| 6,400,263 B1 | | 6/2002 | Kokubo | |
| 6,417,766 B1 | | 7/2002 | Starkey | |
| 6,422,097 B1 | * | 7/2002 | Menard et al. | ............ 73/865.8 |
| 6,481,083 B1 | | 11/2002 | Lawson et al. | |
| 6,591,672 B2 | * | 7/2003 | Chuang et al. | ............ 73/146.8 |
| 6,631,637 B2 | * | 10/2003 | Losey | ........................ 73/146 |
| 6,655,203 B2 | * | 12/2003 | Hsu | ........................ 73/146.8 |

* cited by examiner

Primary Examiner—Nina Tong
(74) Attorney, Agent, or Firm—Harness, Dickey & Pierce, P.L.C.

(57) ABSTRACT

A method and apparatus are provided for installing tire pressure monitor sensors onto wheels and for assembling tires onto wheels having tire pressure monitor sensors. The method includes orienting a wheel to place a tire pressure monitor sensor in a predetermined location using an automated orientation system in order to prevent damage to the tire pressure monitor sensor during assembly of a tire onto the wheel. The orientation of the wheel is detected using signals emitted from the tire pressure monitor sensor in order to ensure that the tire pressure monitor sensor is in its proper predetermined location prior to assembling the tire onto the wheel. After the tire is assembled onto the wheel and is inflated, a signal from the tire pressure monitor sensor is then read in order to determine if the tire pressure monitor sensor is functioning and if the tire is properly inflated.

15 Claims, 6 Drawing Sheets

METHOD AND APPARATUS FOR INSTALLING TIRE PRESSURE MONITOR ASSEMBLY ONTO WHEELS

FIELD OF THE INVENTION

The present invention relates to a method and apparatus for installing tire pressure monitor sensors onto wheels and assembling tires onto the wheels.

BACKGROUND OF THE INVENTION

Tire pressure monitor systems have been developed, including a tire pressure monitor sensor that is mounted to each wheel for sending signals to a central receiving unit aboard a vehicle for providing information regarding the tire pressure and temperature. Each of the tire pressure monitor sensors includes a respective radio frequency transmitter that transmits an RF signal. The RF signal includes both an identifier code and an indicator of tire pressure. A tire pressure monitor system of this type is disclosed in U.S. Pat. No. 5,600,301.

Figure 1:
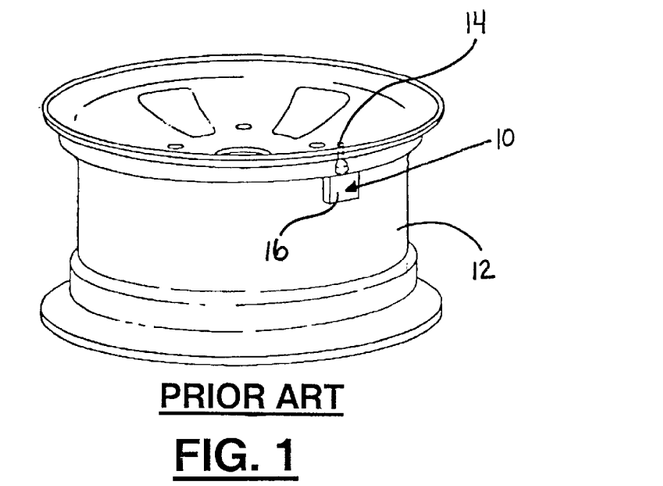
FIG. 1 is a perspective view of a wheel having a tire pressure monitor sensor mounted thereto according to the principles of the present invention.
Figures 2, 3:
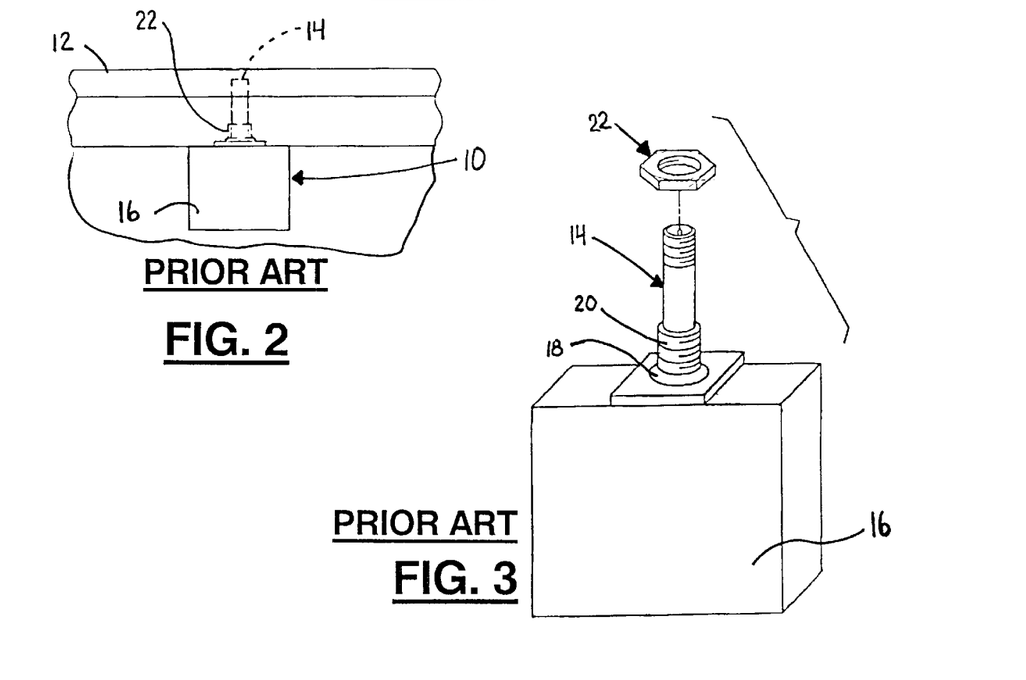
FIG. 2 is a detailed plan view of the tire pressure monitor sensor mounted to the wheel according to the principles of the present invention.
FIG. 3 is a perspective view of a tire pressure monitor sensor and nut according to the principles of the present invention.

As shown in FIG. 1, a known tire pressure monitor sensor 10 is shown mounted to a wheel 12. With reference to FIGS. 1–3, the tire pressure monitor sensor 10 includes a valve stem 14 and a sensor body 16 attached thereto. A rubber seal 18 is provided at a base portion of the valve stem 14. The valve stem 14 is provided with a threaded portion 20 adjacent to the rubber seal 18. The valve stem 14 of the TPMS sensor 10 is inserted through a standard valve stem hole provided in the wheel 12 and a threaded nut 22 is threadedly engaged with the threaded portion 20 of the valve stem 14 in order to secure the TPMS sensor 10 to the wheel 12. The tire pressure monitor sensor 10 includes a pressure transducer and transmitter which transmit both an identification signal and a tire pressure signal to be read by a receiver antenna of a central controller. The body 16 of the tire pressure monitor sensor 10 includes electronics which need to be protected from damage during assembly of the tire onto the wheel. Accordingly, it is desirable in the art to provide a method and apparatus for installing the tire pressure monitor sensor and a tire onto a wheel in a manner that protects the tire pressure monitor sensor from damage.

SUMMARY OF THE INVENTION

The present invention provides a method and apparatus for assembling a tire onto a wheel having a tire pressure monitor sensor comprising the steps of mounting a tire pressure monitor sensor onto the wheel, orienting the wheel to place the tire pressure monitor sensor in a predetermined location using an automated orientation system, and assembling the tire onto the wheel using an automated tire and wheel assembly machine.

In addition, a method of assembling a tire onto a wheel having a tire pressure monitor is provided including mounting a tire pressure monitor sensor onto the wheel, orienting the wheel to place the tire pressure monitor sensor in a predetermined location, detecting an orientation of the wheel to determine if the tire pressure monitor sensor is in the predetermined location using signals emitted from the tire pressure monitor sensor and assembling the tire onto the wheel using an automated tire and wheel assembly machine.

According to another aspect of the present invention, a method of assembling a tire onto a wheel having a tire pressure monitor sensor is provided including mounting a tire pressure monitor sensor onto the wheel, assembling the tire onto the wheel using an automated tire and wheel assembly machine, inflating the tire pressure and reading a tire pressure from the tire pressure monitor sensor in order to confirm that the tire pressure monitor sensor is functioning and that the tire is properly inflated.

According to still another aspect of the present invention, a method of installing a tire pressure monitor sensor onto a wheel is provided including inserting a stem of a tire pressure monitor sensor into a hole in a wheel. A nut is applied to the threaded portion of the stem and is tightened to a first torque level beyond a required torque level. The nut is then loosened and then retightened to a second torque level below the first torque level. The nut is then held at the second torque level for a predetermined amount of time. As the elastomeric seal around the stem of the tire pressure monitor sensor adjusts to the applied torque, a residual torque level, at a final torque level, is then obtained.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 4:
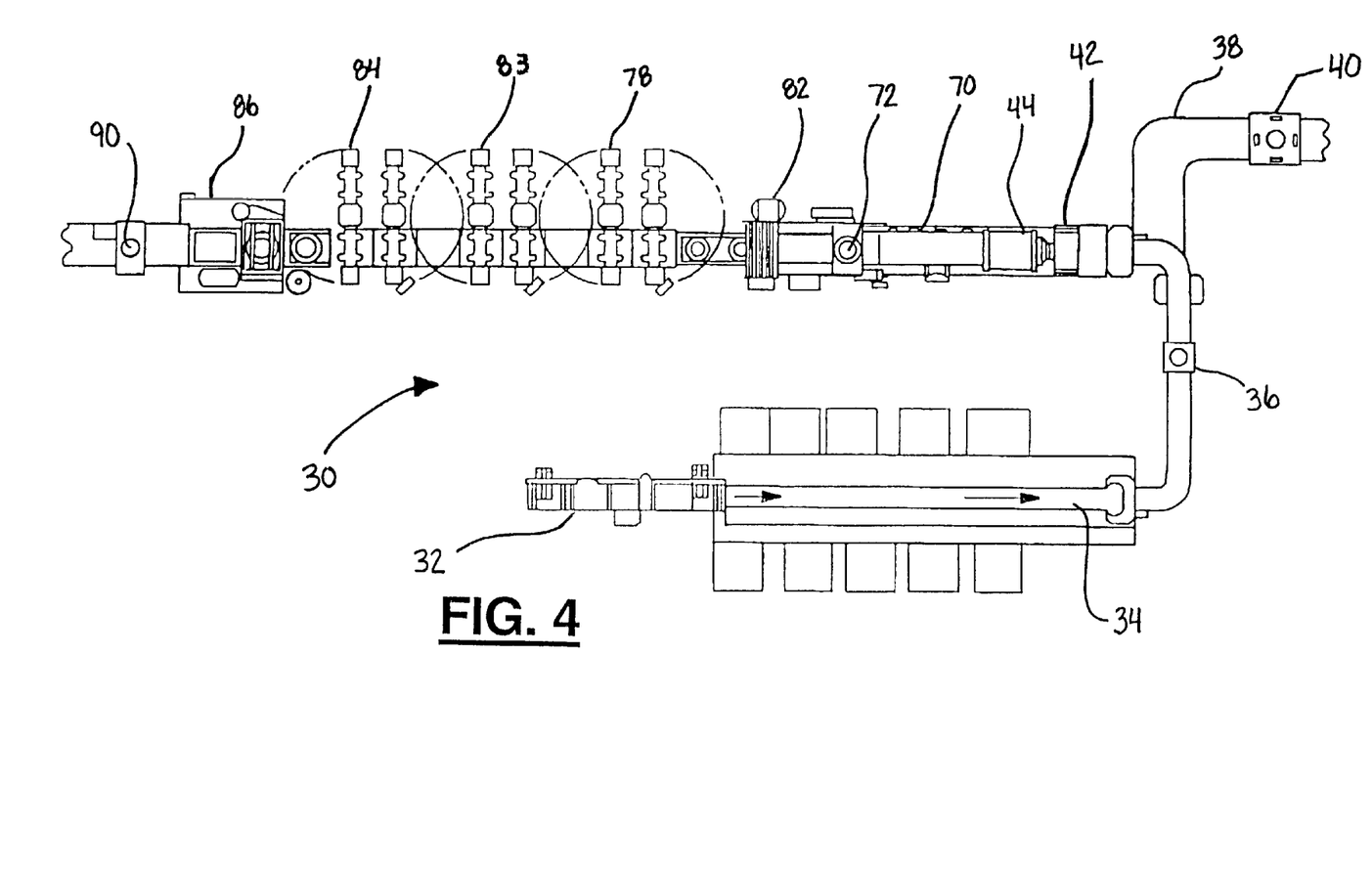
FIG. 4 is a schematic layout of a manual tire pressure monitor sensor installation and tire mounting assembly layout according to the principles of the present invention.

With reference to FIG. 4, a manual tire pressure monitor sensor assembly station and tire mounting assembly system is shown generally indicated by reference numeral 30. The assembly system includes a tire pressure monitor sensor manual installation station 32 at which a wheel is loaded by an operator onto a wheel conveyer and a tire pressure monitor sensor is installed onto the wheel manually by an operator utilizing an automated nut runner. The operator inserts the valve stem 14 of the tire pressure monitor sensor 10 into the hole in the wheel 12, slides the nut 22 over the top of the valve stem 14, and threadedly engages the nut 22 with the threaded portion 20 of the valve stem 14 using an automated nut runner. The automated nut runner includes a DC motor that drives a socket according to a predetermined tightening operation. In particular, as illustrated in FIG. 6, after the stem 14 of the tire pressure monitor sensor 10 is inserted into the hole in the wheel at step S1, and the nut is applied to the stem at step S2, the nut runner tightens the nut 22 beyond a required torque level at step S3. The nut 22 is then loosened at step S4 and then retightened at step S5 to a target torque which is below the first torque level obtained in step S3. The nut 22 is then held for a predetermined amount of time at the target torque level and then released by the socket. Due to the elastomeric seal portion 18 surrounding the valve stem 14, the specific tightening sequence described above with reference to FIG. 6 allows a residual torque level to be obtained and more closely predicted and controlled. By initially tightening the nut 22 beyond its required torque level and subsequently loosening the nut 22, the elastic material of the seal 18 displays more predictable characteristics when the nut 22 is then tightened to a target torque and held for a predetermined amount of time on the order of fractions of a second so that the residual torque on the threaded connection is closely controlled to be within a predetermined torque level. The nut tightening sequence described above with respect to FIG. 6 can also be used in an automated installation station wherein the installation of the tire pressure monitor sensor 10 is fully automated, as will be described in greater detail herein with respect to FIG. 5.

Returning to FIG. 4, after the tire pressure monitor sensor 10 is installed at the manual installation station 32, the wheel 12 is then carried along the wheel conveyer 34 to a wheel vision station 36 which is optionally provided for confirming the presence of a wheel on the conveyer 34. A tire conveyer 38 is provided for carrying tires to be mated with the wheels. The tire conveyer includes a tire vision station 40 which is optionally provided for confirming the presence of a tire on the tire conveyer 38. The wheel conveyer 34 then includes a standard stemmer station which is provided for installing standard valve stems on the wheel in the case that the specific wheel assembly does not require a tire pressure monitor sensor. The standard stemmer station is capable of installing a standard valve stem onto the wheel, if necessary. A standard stemmer station 42 such as the one disclosed is well known in the art. The stemmer station is provided with a tire pressure monitor sensor reader which is monitored to determine if a tire pressure monitor sensor is mounted and operational in the wheel. If a tire pressure monitor sensor is detected, a signal is provided to the standard stemmer station to allow the wheel with a tire pressure monitor sensor mounted thereto to bypass the stemmer and enter into an auto orientation station 44.

Figure 7:
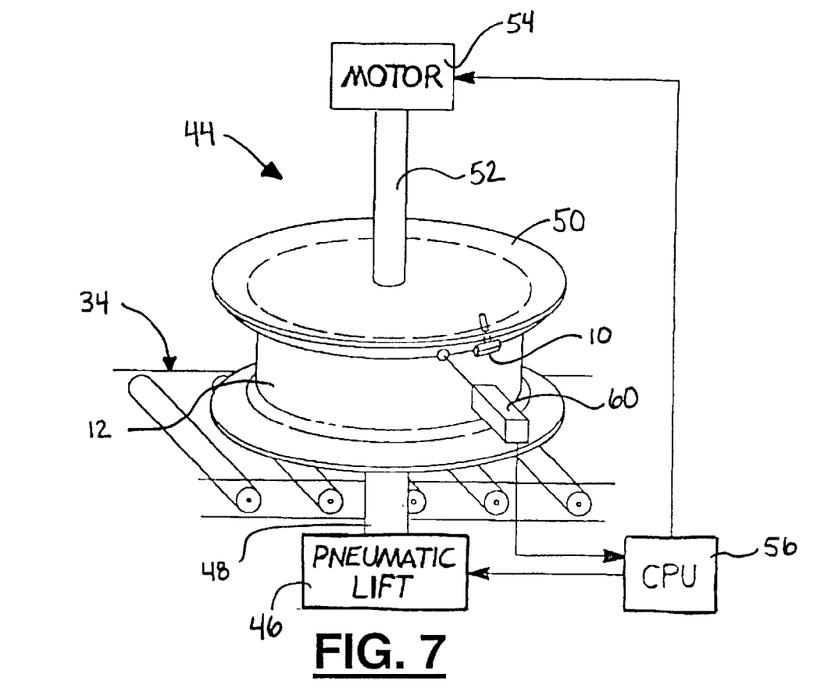
FIG. 7 is a schematic perspective view of a wheel orientation station for orienting the tire pressure monitor sensor in a predetermined location according to the principles of the present invention.
Figure 8A:
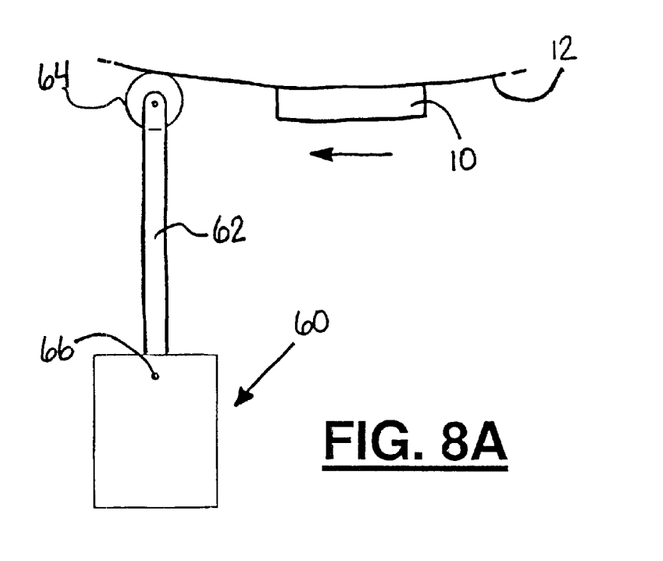
FIG. 8a is a schematic view of a trigger switch of the orientation station being utilized for detecting the position of the tire pressure monitor sensor according to the principles of the present invention.
Figure 8B:
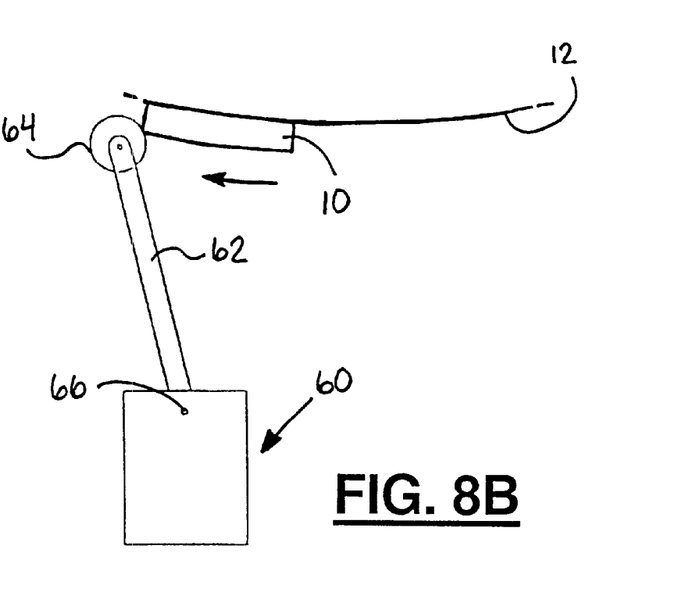
FIG. 8b illustrates the trigger switch of FIG. 8a in engagement with the tire pressure monitor sensor for tripping the trigger switch according to the principles of the present invention.

As illustrated at FIG. 7, the auto orientation station 44 includes a lift mechanism 46 with a rotary spindle 48 that is activated to lift the wheel 12 off of the conveyer 34 which is then engaged by a friction plate 50 which is mounted to a driveshaft 52 which is driven by a motor 54. A controller 56 controls the lift mechanism 56 for raising and lowering the wheel 12 and also controls the motor 54 for driving the friction plate 50. A trigger switch 60 is provided with a pivoting arm 62 having a roller 64 that engages a perimeter surface of the wheel 12. With reference to FIGS. 8a and 8b, the trigger switch 60 is shown with the arm 62 biased to a forward position with the roller 64 engaging the wheel 12. As the wheel 12 is rotated by the friction plate 50, the tire pressure monitor sensor 10 moves in the direction of arrow A. As the tire pressure monitor sensor 10 engages the roller 64 (as illustrated at FIG. 8b) the arm 62 rotates about pivot point 66 thereby flipping the switch within the trigger switch 60. The trigger switch 60 then conveys a signal to the controller 56 indicating the presence of the tire pressure monitor sensor 10 in the vicinity of the trigger switch 60. The controller 56 immediately stops the motor 54 and then subsequently provides a signal to the lift mechanism 46 to lower the wheel 12 back onto the conveyer 34. With the automated orientation station 44, according to the principles of the present invention, the orientation of the wheel 12 is known such that the tire pressure monitor sensor 10 is provided at a predetermined position that will allow a tire mounting to occur without damage to the sensor.

An optional manual orientation backup station is also provided in case the auto orientation station 44 is not operating properly, an operator can manually orient the wheels 12 at the manual orientation backup station 70 such that the wheels are properly oriented for tire installation.

Figure 9:
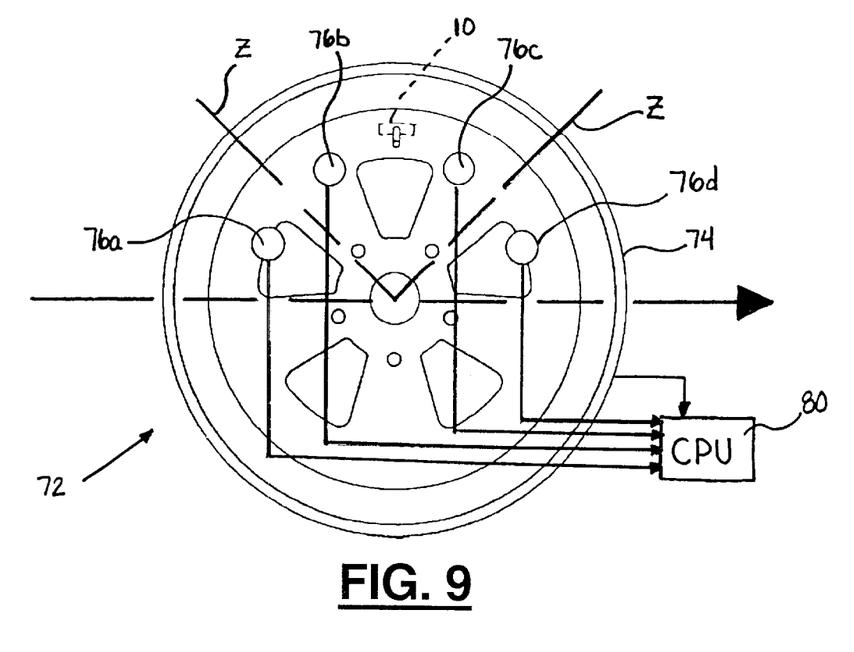
FIG. 9 is a schematic view of a tire pressure monitor sensor orientation reader station according to the principles of the present invention.

A tire pressure monitor sensor orientation reader station 72 is also provided for detecting the proper orientation of the tire pressure monitor sensor on the wheels prior to introduction to the tire mounter stations 78. As illustrated in FIG. 9, the tire monitor sensor orientation reader station is provided with a first large coil antenna 74 which is capable of retrieving a signal from the tire pressure monitor sensor that allows the assembly system to confirm the presence of a tire pressure monitor sensor 10 on the wheel 12. Once the presence of a tire pressure monitor sensor is confirmed via a signal received by the coil antenna 74, a series of local antennas 76a–76d are then utilized for detecting whether the tire pressure monitor sensor 10 is properly oriented prior to passing on to the tire mounter station 78. In particular, the local antennas 76a–76d are capable of detecting the presence of the tire pressure monitor sensor 10 within a localized position and a controller 80 logically determines the position of the tire pressure monitor sensor 10 based upon which of the local antennas 76a–76d are capable of receiving a signal transmitted by the tire pressure monitor sensor 10. For example, if the controller 80 receives a signal from local antenna 76a or 76d, it is determined by the processor 80 that the tire pressure monitor sensor is outside of the desired zone Z, and therefore, that the tire is improperly oriented for going to the tire mounting stations 78. Thus, a signal would then be provided by the processor 80 to signal to an operator that the tire is improperly oriented. If the processor 80 only receives signals from one or both of the local antennas 76b, 76c which are within the desired zone Z, it is determined that the tire pressure monitor sensor 10 is within the acceptable zone Z and the tire 12 is allowed to progress to the tire mounter stations 78.

After the wheel passes through the tire pressure monitor sensor orientation reader station 72, the wheel is passed on to the dual tire mounter stations 78. The wheel 12 is mated with a tire which passes through a soaper/loader station 82, as is known in the art, and the tire is mounted to the wheel by one of the dual tire mounter stations 78, as is well known in the art. With reference to FIG. 1, it can be seen that the tire pressure monitor sensor 10 extends into the space disposed radially outside of the wheel 12 and radially inside of the tire (not shown), and if improperly oriented, can be damaged by the tire mounter station during the tire mounting process. However, by properly orienting the wheel 12, the tire pressure monitor sensor 10 can be oriented in a position that does not interfere with the tire mounting mechanism and therefore, will not be damaged during the tire mounting process. After the dual tire mounter stations 78, the wheels with mounted tires pass through a dual matcher station 83, as is known in the art, and then to a dual inflator station 84 at which the tires are inflated. The tires then pass to a load simulator station 86, as known in the art. After the load simulator, the inflated wheel assembly passes through a tire pressure monitor sensor end of tireline reader station 90 which detects the tire pressure as transmitted by the tire pressure monitor sensor for both detecting that the tire pressure monitor sensor is functioning and that the tire is properly inflated. The data read from the tire pressure monitor sensor can include both the sensor identifier code and the measured tire pressure which can be stored into a database for future use and/or for writing to an onboard vehicle computer in order to trace the assembly history of the wheel assembly.

Figure 5:
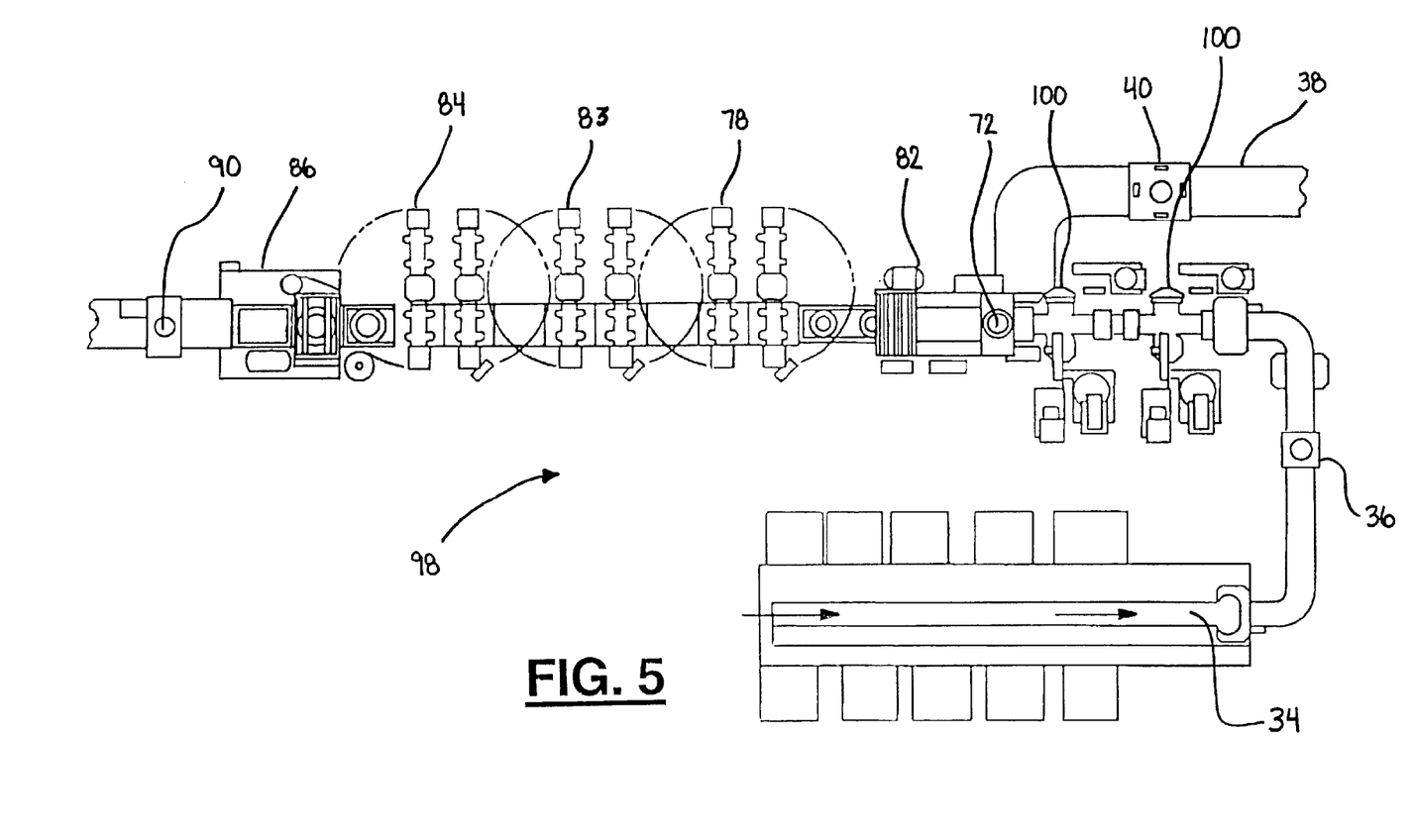
FIG. 5 is a schematic layout of an automatic tire pressure monitor sensor installation and tire mounting assembly layout according to the principles of the present invention.
Figure 6:
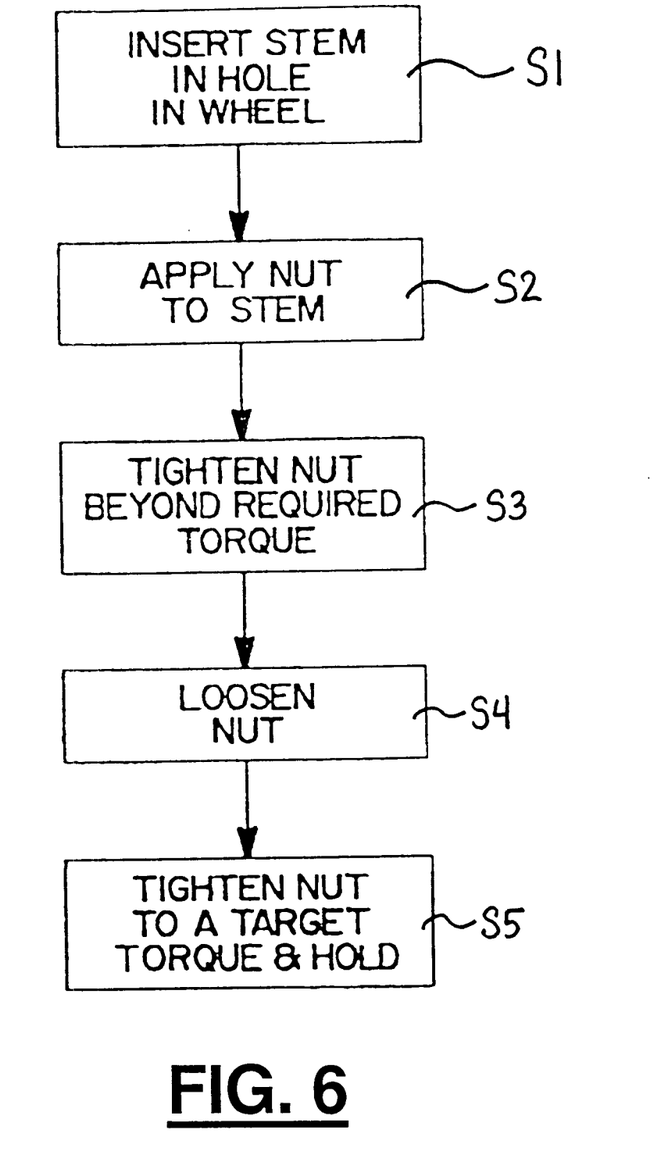
FIG. 6 is a flow diagram illustrating the assembly steps for mounting a tire pressure monitor sensor to a wheel according to the principles of the present invention.

With reference to FIG. 5, a description of an automatic assembly layout 98, including an automated tire pressure monitor sensor installation system, will now be described wherein like reference numerals are utilized to identify common elements with the system disclosed with respect to FIG. 4. In FIG. 5, a wheel conveyer 34 is provided on which wheels can be loaded by an operator. The wheels 12 then pass through an optional wheel vision station 36, as described above. The wheels 12 then pass through a tire pressure monitor sensor automated assembly station 100 where a tire pressure monitor sensor 10 is assembled to the wheel 12 by an automated system. Optionally, two automated tire pressure monitor sensor installation stations 100 can be utilized in order to increase the capacity of the assembly line. Similar to the system of FIG. 4, a tire conveyer 38 is provided for conveying tires to be mated with the wheels 12 and includes a tire vision station 40 to confirm the presence of a tire on the conveyer 38.

After the automated tire pressure monitor sensor assembly stations 100, a tire pressure monitor sensor orientation reader station 72 is provided. With the automated tire pressure monitor sensor assembly stations 100, a separate auto orientation station, such as station 44 described in FIG. 4, is not necessary due to the fact that the automated tire pressure monitor sensor assembly stations 100 will similarly orient the wheels 12 as a necessary step for installing the tire pressure monitor sensors 10 onto the wheels 12.

After the wheels 12 leave the automated tire pressure monitor sensor assembly stations 100, the wheels are properly oriented for passing to the tire mounter stations 78. Just prior to entering into the tire mounter stations 78, the tires from the tire conveyer 38 are passed through a soaper/loader station 82 which soaps the tire and loads the tire onto the mated wheel. The tire is then mounted to the wheel at one of the dual tire mounter stations 78. The wheel assemblies are then passed to the dual matcher stations 83, dual inflator stations 84, and load simulator 86, as described above with reference to FIG. 4. The inflated wheel assembly is then passed through the tire pressure monitor sensor end of tireline reader station 90 where the signal from the tire pressure monitor sensor 10 is read in order to confirm that the tire pressure monitor sensor is properly functioning and that the tire is properly inflated. If a signal is not received by the reader station 90, a signal is provided to an operator that the tire is either improperly inflated, or that the tire pressure monitor sensor is not properly functioning.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of assembling a tire onto a wheel having a tire pressure monitor sensor, comprising:

mounting a tire pressure monitor sensor onto the wheel;

orienting said wheel to place said tire pressure monitor sensor in a predetermined location using an automated orientation system; and assembling the tire onto the wheel using an automated tire and wheel assembly machine.

2. The method according to claim 1, wherein said step of orienting said wheel includes the step of rotating the wheel until a location of said tire pressure monitor sensor is sensed at a predetermined position.

3. The method according to claim 2, wherein said step of orienting said wheel includes lifting said wheel on a rotatable spindle.

4. The method according to claim 2, wherein said step of rotating the wheel until a location of said tire pressure monitor sensor is sensed at a predetermined position includes providing a switch device in contact with said wheel such that the tire pressure monitor sensor engages said switch device as the tire pressure monitor sensor is rotated to said predetermined position.

5. A method of assembling a tire onto a wheel having a tire pressure monitor sensor, comprising:

placing a wheel onto a conveyor system;

mounting a tire pressure monitor sensor onto the wheel;

orienting said wheel to place said tire pressure monitor sensor in a predetermined location using an automated orientation system; assembling the tire onto the wheel using an automated tire and wheel assembly machine; and inflating said tire.

6. The method according to claim 5, wherein said step of orienting said wheel includes the step of rotating the wheel until a location of said tire pressure monitor sensor is sensed at a predetermined position.

7. The method according to claim 6, wherein said step of orienting said wheel includes lifting said wheel on a rotatable spindle.

8. The method according to claim 6, wherein said step of rotating the wheel until a location of said tire pressure monitor sensor is sensed at a predetermined position includes providing a switch device in contact with said wheel such that the tire pressure monitor sensor engages said switch device as the tire pressure monitor sensor is rotated to said predetermined position.

9. The method according to claim 5, wherein said automated orientation station is disposed along said conveyor system.

10. A method of assembling a tire onto a wheel having a tire pressure monitor sensor, comprising:

mounting a tire pressure monitor sensor onto the wheel;

orienting said wheel to place said tire pressure monitor sensor in a predetermined location;

detecting an orientation of said wheel to determine if the tire pressure monitor sensor is in said predetermined location using signals emitted from said tire pressure monitor; and assembling the tire onto the wheel using an automated tire and wheel assembly machine.

11. The method according to claim 10, wherein said step of detecting an orientation of said wheel includes the step of utilizing a series of antennas located at predetermined locations in an orientation detecting station, said antennas being oriented in predetermined logical positions such that an orientation of said wheel can be logically determined based upon which of the series of antennas detect a signal emitted by said tire pressure monitor sensor.

12. The method according to claim 11, further comprising the step of utilizing an antenna to detect a presence of a tire pressure monitor sensor on a wheel.

13. A method of assembling a tire onto a wheel having a tire pressure monitor sensor, comprising:

placing the wheel on a conveyor system;

mounting a tire pressure monitor sensor onto the wheel;

detecting an orientation of said wheel on said conveyor system to determine if the tire pressure monitor sensor is in said predetermined location using signals emitted from said tire pressure monitor; and assembling the tire onto the wheel using an automated tire and wheel assembly machine.

14. The method according to claim 13, wherein said step of detecting an orientation of said wheel includes the step of utilizing a series of antennas located at predetermined locations in an orientation detecting station of said conveyor system, said antennas being oriented in predetermined logical positions such that an orientation of said wheel can be logically determined based upon which of the series of antennas detect a signal emitted by said tire pressure monitor sensor.

15. The method according to claim 14, further comprising the step of utilizing an antenna to detect a presence of a tire pressure monitor sensor on a wheel.

* * * * *